(12) United States Patent
Campbell et al.

(10) Patent No.: US 7,390,038 B2
(45) Date of Patent: Jun. 24, 2008

(54) INTEGRATED BUMPER AND UPPER FASCIA COMPONENTS OF A MOTOR VEHICLE

(75) Inventors: Mark H. Campbell, Oshawa (CA);
Daniel M. Bangala, Thornhill (CA);
Darin Evans, Wixom, MI (US);
Anthony Jackson, Canton, MI (US)

(73) Assignees: GM Global Technology Operations, Inc., Detroit, MI (US); Netshape International LLC, Novi, MI (US)

( * ) Notice: Subject to any disclaimer, the term of this patent is extended or adjusted under 35 U.S.C. 154(b) by 0 days.

(21) Appl. No.: 11/294,336

(22) Filed: Dec. 5, 2005

(65) Prior Publication Data
US 2007/0046042 A1 Mar. 1, 2007

Related U.S. Application Data

(63) Continuation of application No. 10/691,105, filed on Oct. 22, 2003, now abandoned, and a continuation-in-part of application No. 10/895,500, filed on Jul. 21, 2004, now Pat. No. 6,997,490.

(60) Provisional application No. 60/489,031, filed on Jul. 22, 2003.

(51) Int. Cl.
*B60R 19/02* (2006.01)

(52) U.S. Cl. .................................... 293/102

(58) Field of Classification Search ............... 293/102, 293/103, 115, 117, 120, 142, 145, 155; 296/187.01, 296/187.03, 187.09, 203.01, 203.02; 29/897.2
See application file for complete search history.

(56) References Cited

U.S. PATENT DOCUMENTS

| | | | |
|---|---|---|---|
| 6,540,275 B1 * | 4/2003 | Iwamoto et al. | 293/24 |
| 6,634,702 B1 * | 10/2003 | Pleschke et al. | 296/187.04 |
| 6,997,490 B2 * | 2/2006 | Evans et al. | 293/120 |
| 7,192,068 B1 * | 3/2007 | Kim | 293/133 |
| 2005/0017520 A1 * | 1/2005 | Evans et al. | 293/120 |
| 2005/0087999 A1 * | 4/2005 | Campbell et al. | 293/120 |

* cited by examiner

*Primary Examiner*—H Gutman

(57) ABSTRACT

An integrated, single piece upper fascia support member and bumper energy absorber, wherein the upper fascia support member is structured to provide attachments for various attached parts of a motor vehicle, and wherein the upper fascia support member is integrally connected to the bumper energy absorber of the motor vehicle via a load isolator. The load isolator connects the upper fascia support member to the bumper energy absorber in a fixed position relative to each other (assuming relative loading is below a predetermined threshold) and manages a load applied, relatively, to one of the upper fascia support member and the bumper energy absorber such as to cause relative movement, from adversely affecting the other, as, for example, keeping vehicle damage to a minimum in the event of an untoward impact event.

17 Claims, 4 Drawing Sheets

INTEGRATED BUMPER AND UPPER FASCIA COMPONENTS OF A MOTOR VEHICLE

RELATED APPLICATIONS

This application is a continuation of U.S. Ser. No. 10/691,105 filed Oct. 22, 2003 now abandoned. It is also a continuation-in-part of U.S. Ser. No. 10/895,500 filed Jul. 21, 2004 now U.S. Pat. No. 6,997,490, which claims the priority of U.S. Provisional Ser. No. 60/489,031 filed Jul. 22, 2003.

TECHNICAL FIELD

The present invention relates to the bumper and fascia components of a motor vehicle, more particularly the bumper energy absorber and the upper fascia support components, and more particularly to a load isolator for conjoining, yet load isolating, the bumper energy absorber and the upper fascia support components.

BACKGROUND OF THE INVENTION

Motor vehicles include an energy absorber at the front and rear bumper for purposes of crash energy absorption. Additionally, motor vehicles utilize an upper fascia support in the form of brackets, flanges or braces to support and align attached parts such as head/tail lamps, hood/tailgate/trunk lid bumper pads, etc. with the sheet metal body and frame of the vehicle. The energy absorbers and the upper fascia support members are separate components, requiring separate manufacturing, shipping, material handling, and motor vehicle installation.

Motor vehicle manufacturers have long been faced with the challenge of achieving ever tighter fits between components and attached parts, while ever controlling costs and increasing production efficiency. In this regard, it would be very beneficial if somehow the upper fascia support could provide attachment locations for various attached parts so that they would be precisely located relative to the motor vehicle. Further in this regard, it would also be very beneficial if the energy absorber and the upper fascia support could be integrated, provided the problem of load induced deformations, due to, for example, those arising out of impact or thermal origins, could somehow be overcome.

SUMMARY OF THE INVENTION

The present invention is an integrated upper fascia support member and bumper energy absorber, wherein the upper fascia support member is structured to provide attachments for various attached parts of a motor vehicle, and wherein the upper fascia support member is integrally connected to the bumper energy absorber of the motor vehicle via a load isolator.

The integrated upper fascia support member and bumper energy absorber according to the present invention has a single piece construction, wherein the upper fascia support member is integrally connected to the bumper energy absorber by a load isolator which undergoes deformation in the event a predetermined threshold level of load is applied to either one of the upper fascia support member and the bumper energy absorber relative to the other such as to cause relative movement therebetween. The preferred composition and manufacture of the present invention is a single piece molded polymeric motor vehicle component, preferably formed by an injection molding process.

The preferred motor vehicle locations of the present invention are at the front or rear ends thereof. In this regard, the constituents of the integrated single piece component which constitutes the integrated upper fascia support member and bumper energy absorber according to the present invention serve synergistically, as follows. The bumper energy absorber forms a part of the bumper which is attached to the structure of the motor vehicle. The bumper energy absorber deforms so as to provide crash management by energy absorption of a low speed vehicle impact. The upper fascia support member attaches to the vehicle sheet metal structure and provides support and precise location of (i.e., setting the gap with regard to) various attached parts, as for example hood/tailgate/trunk lid over-slam bumper pads, head/tail lights, front grill, radiator, etc. When placed at the front end of the motor vehicle, the upper fascia support member integrates head light attachment provisions and hood bumper pads so as to achieve a good fit with respect to the hood, fenders and grille. The load isolator provides two functions: 1) connecting the upper fascia support member to the bumper energy absorber in a fixed position relative to each other (assuming relative loading is below a predetermined threshold, and 2) management of a load applied, relatively, to one of the upper fascia support member and the bumper energy absorber such as to cause relative movement therebetween, from adversely affecting the other, as for example, keeping vehicle damage to a minimum in the event of an untoward impact event.

The load isolation is preferably in the form of a plurality of load isolation arms, wherein the load isolation arms may have a certain shape selected from a range of possible shapes, as for example: an S-shape, a V-shape, a U-shape, a semicircular shape, or an irregular shape, as for example a single loop shape or a multiple loop shape. The number, placement, width, thickness and shape of the load isolator arms is predetermined to accommodate a specific vehicular application. Load isolation as between the upper fascia support member and the bumper energy absorber can be accomplished by elastic deformation of the load isolation arms of the load isolator, wherein the deformation may be in the form of bending or bending and breaking of the load isolation arms, as for example during an untoward vehicle impact.

From the foregoing, it will be appreciated that the integrated bumper energy absorber and upper fascia support member according to the present invention provides improved appearance due to a tighter fit of vehicular components and attached parts, yet eliminates the need of separate components and reduces piece cost through tooling savings, manufacturing, shipping, processing and material management. Consequently, the assembly plants manufacturing motor vehicles equipped with the present invention achieve higher quality and improved productivity.

Accordingly, it is an object of the present invention to provide an integrated upper fascia support member and bumper energy absorber, wherein the upper fascia support member is structured to provide support for various attached parts of a motor vehicle, and wherein the universal upper fascia support member is integrally connected to the bumper energy absorber of the motor vehicle via a load isolator.

This and additional objects, features and advantages of the present invention will become clearer from the following specification of a preferred embodiment.

DESCRIPTION OF THE PREFERRED EMBODIMENT

Figure 1:
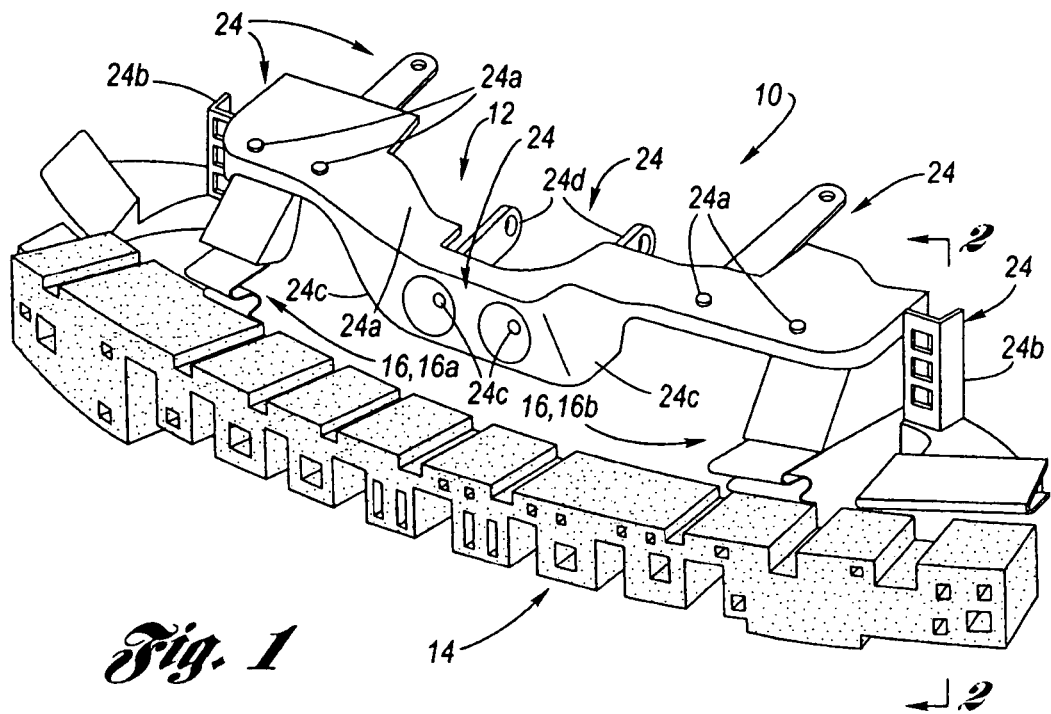
FIG. 1 is a perspective view of an integrated upper fascia and bumper energy absorber according to the present invention having an S-shaped load isolator, shown adapted for location at the front end of a motor vehicle.
Figure 6:
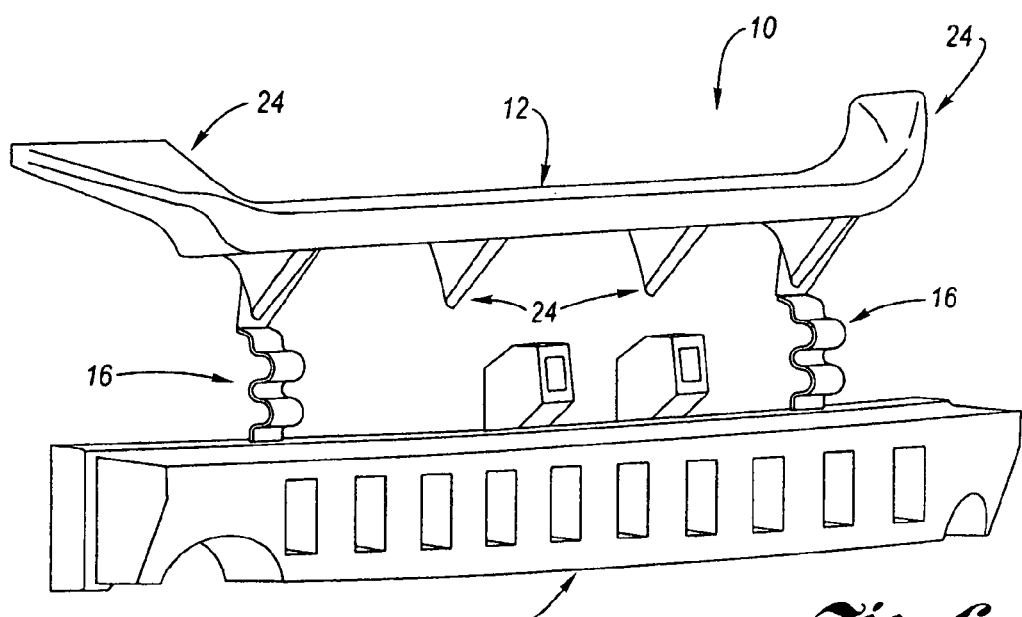
FIG. 6 is a perspective view of an integrated upper fascia and bumper energy absorber according to the present invention having an S-shaped load isolator, shown adapted for location at the rear end of a motor vehicle.

Referring now to the Drawing, FIG. 1 depicts a view of an integrated upper fascia and bumper energy absorber 10 according to the present invention. It will be seen that there is unity of construction, in that the integrated upper fascia and bumper energy absorber 10 is an integrated, integral single piece component having essentially three sections: an upper fascia support member 12, a bumper energy absorber 14 and a load isolator 16 which integrally connects the upper fascia support member to the bumper energy absorber. The preferred composition and manufacture of the integrated upper fascia and bumper energy absorber 10 is a single piece molded polymeric motor vehicle component, preferably formed by an injection molding process. The integrated upper fascia and bumper energy absorber 10 may be installed on a motor vehicle at either the front end of the vehicle, as shown at FIG. 1, or rear end of the vehicle, as shown at FIG. 6.

Figures 2, 2A:
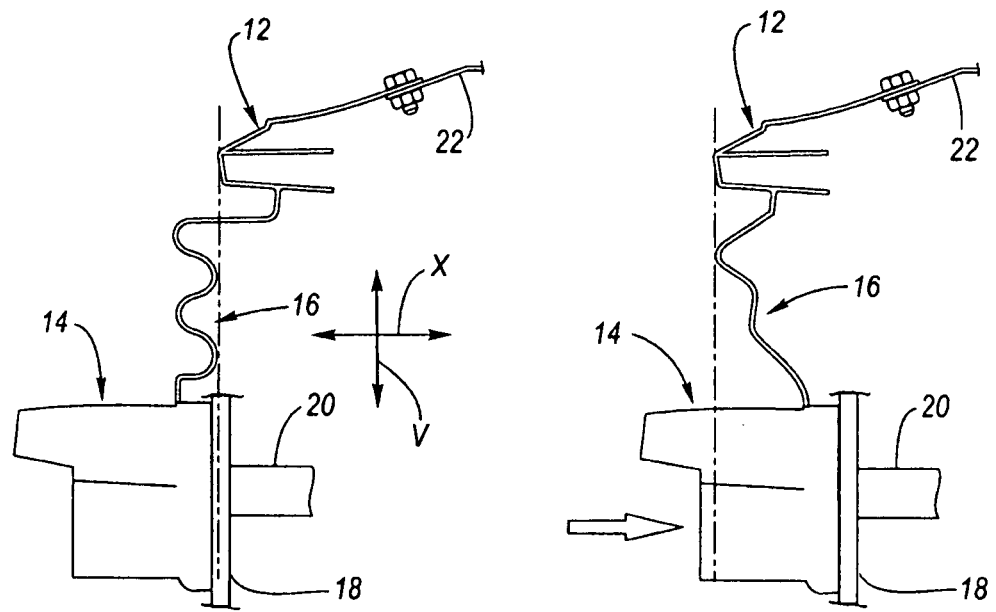
FIG. 2 is a side view of the integrated upper fascia and bumper energy absorber as shown at FIG. 1, now shown schematically installed at the front end of a motor vehicle.
FIG. 2A is a side view of the integrated upper fascia and bumper energy absorber according to the present invention, as shown at FIG. 2, wherein now the bumper energy absorber has suffered an impact and been displaced rearwardly such as to cause deformation of the load isolator.

As shown schematically at FIG. 2, the bumper energy absorber 14 may be overmolded or otherwise covered by an external bumper 18, wherein the bumper is attached to a structural member 20 of the motor vehicle. The purpose of the bumper energy absorber is to provide a structure which undergoes deformation in the event of a low speed vehicle impact so as to provide crash management by energy absorption.

As also shown schematically at FIG. 2, the upper fascia support member 12 attaches to the vehicle sheet metal structure 22 and provides support and precise attachment locations 24 of (i.e., setting the gap with regard to) various attached parts, as for example hood over-slam bumper pads attachment locations 24a, head light attachment locations 24b, front grill attachment locations 24c and radiator bracket attachment locations 24d. When placed at the front end of the motor vehicle (as shown at FIG. 2), the upper fascia support member integrates the attachment locations 24 so as to achieve a good fit with respect to the hood, fenders and grille.

Figure 5:
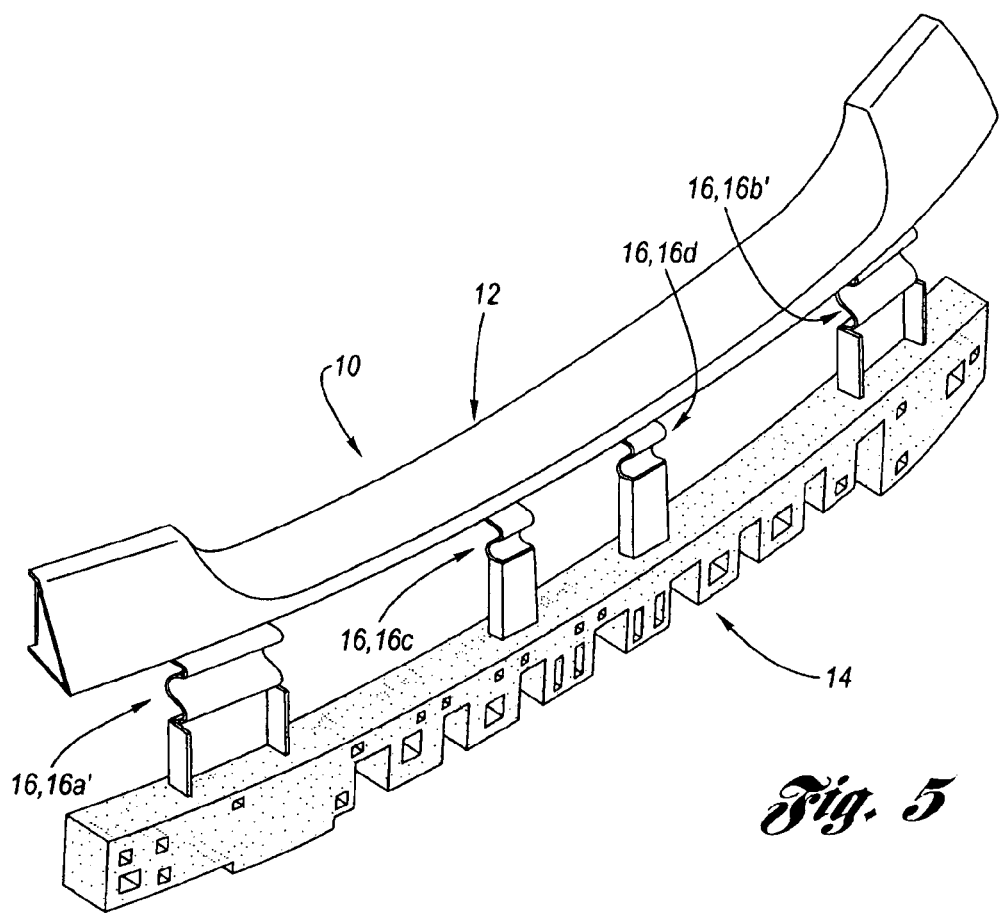
FIG. 5 is a perspective view of an integrated upper fascia and bumper energy absorber according to the present invention similar to that shown in FIG. 1, wherein now an S-shaped load isolator has additional (intermediate and outboard) load isolator arms.

The load isolator 16 is structured so that, in the uninstalled state, it will keep the upper fascia support member in a fixed position relative to the bumper energy absorber provided a load above a predetermined threshold is not applied, relatively, to one or the other. Upon installation in a motor vehicle, the load isolator 16 will deform by bending or by bending and breaking in the event a load sufficient to move the upper fascia support member relative to the bumper energy absorber occurs in an axial direction X, a vertical direction V, or a direction which is some combination thereof. It is preferred in this regard for the load isolator 16 to be in the form of a plurality of load isolator arms, as for example a pair of outboard load isolator arms 16a, 16b, as shown at FIG. 1, or as for another non-limiting example a pair of outboard load isolator arms 16a', 16b' in association with a pair of inboard isolation arms 16c, 16d, which are differently configured from the outboard load isolator arms, as shown at FIG. 5.

Each of the upper fascia support member 12, bumper energy absorber 14 and load isolator 16 may be composed of different material even though they are integrally joined together as a single piece component. In the event the load isolator 16 is composed of the same material as that of the upper fascia support member 12 (which is generally rigid due to its selected thickness), and the bumper energy absorber 14 (which is configured so as to absorb crash energy as it deforms for impacts above a certain predetermined crash load threshold), because of the selected number, selected relative spacing, selected shape, selected width and selected thickness of the load isolator arms, they deform when a load is applied such that the upper fascia support member 12 or the bumper energy absorber 14 is moved out of original position with respect to the other, as could happen in an impact event or unequal vehicular component expansions of a thermal origin. Examples of relative movements are shown in FIGS. 2A through 3B.

Figures 2B, 2C:
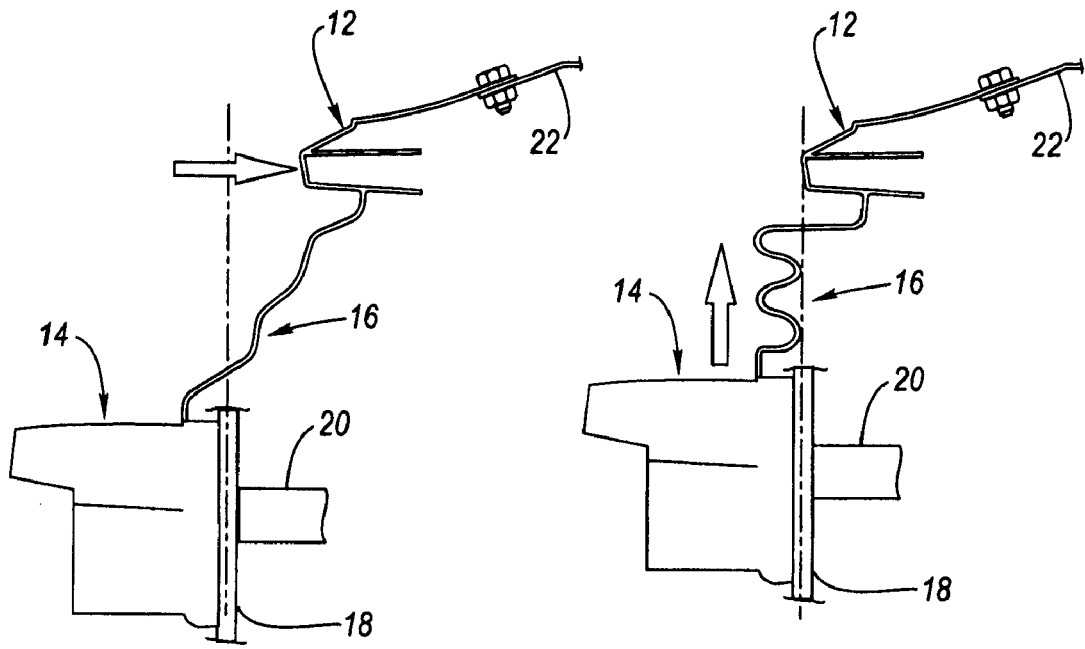
FIG. 2B is a side view of the integrated upper fascia and bumper energy absorber according to the present invention, as shown at FIG. 2, wherein now the upper fascia support member has suffered an impact and been displaced rearwardly such as to cause deformation of the load isolator.
FIG. 2C is a side view of the integrated upper fascia and bumper energy absorber according to the present invention, as shown at FIG. 2, wherein now a load applied to the bumper energy absorber has caused it to move vertically toward the upper fascia support member such as to cause deformation of the load isolator.

In FIG. 2A, the bumper energy absorber has been impacted so as to push it rearward relative to its original position, indicated by plane A in FIG. 2, with respect to the upper fascia support member. In this regard, an S-shaped load isolator 16 has deformably stretched to accommodate this relative movement. In FIG. 2B, the upper fascia support member 12 has been impacted so as to push it rearward relative to its original position at plane A with respect to the bumper energy absorber 14. In this regard, the S-shaped load isolator 16 has deformably stretched in an opposite direction from that of FIG. 2A in order to accommodate this relative movement. In FIG. 2C, the bumper energy absorber 14 has been subjected to a load which has moved it vertically out of its original installation position toward the upper fascia support member 12, wherein the S-shaped load isolator 16 has compressibly deformed to accommodate this relative movement. It is clear from the foregoing that a vertical separation increase between the upper fascia support member and the bumper energy absorber would result in a deformable stretching of the load isolator.

Figures 3A, 3B:
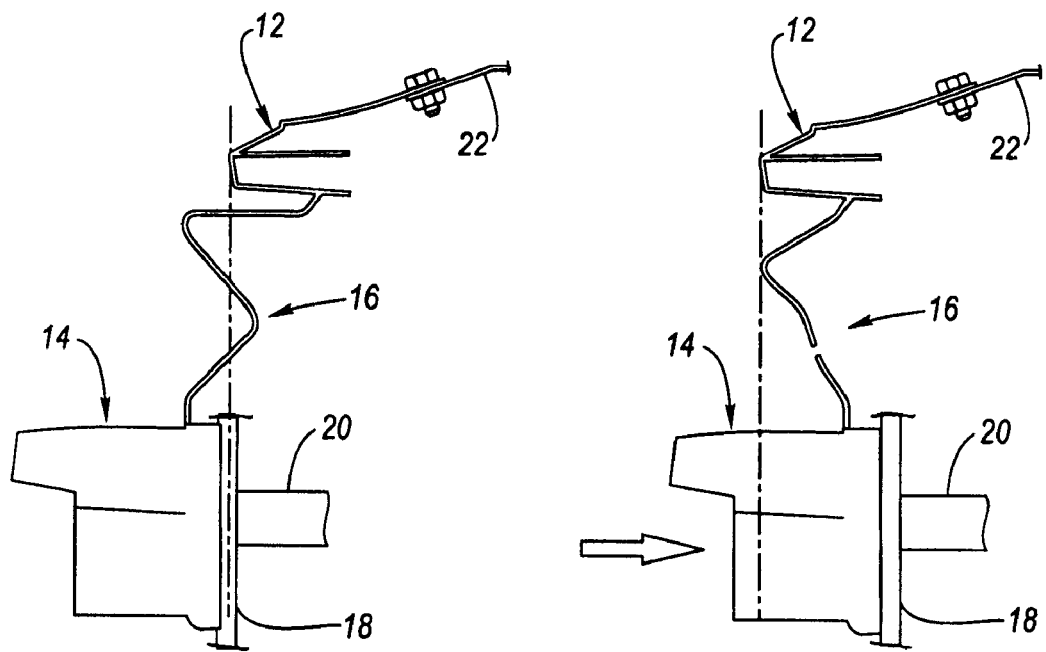
FIG. 3A is a side view of the integrated upper fascia and bumper energy absorber according to the present invention having V-shaped load isolator, showing a schematic installation at the front end of a motor vehicle.
FIG. 3B is a side view of the integrated upper fascia and bumper energy absorber according to the present invention, as shown at FIG. 3A, wherein now the bumper energy absorber has suffered an impact and been displaced rearwardly such as to cause deformation of the load isolator.

In FIG. 3B, the bumper energy absorber 14 has been impacted so as to push it rearward relative to its original position, indicated by plane A' in FIG. 3A with respect to the upper fascia support member 12. In this regard, a V-shaped load isolator 16 has deformably stretched, and then deformably broken, to accommodate this relative movement.

Figure 4A:
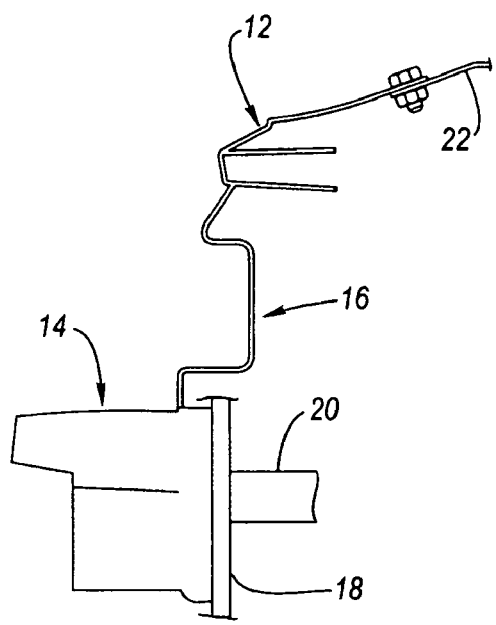
FIGS. 4A through 4C each show a side view of the integrated upper fascia and bumper energy absorber according to the present invention, showing a schematic installation at the front end of a motor vehicle, wherein the load isolator is, respectively, U-shaped, semicircularly shaped, and irregularly shaped.
Figure 4B:
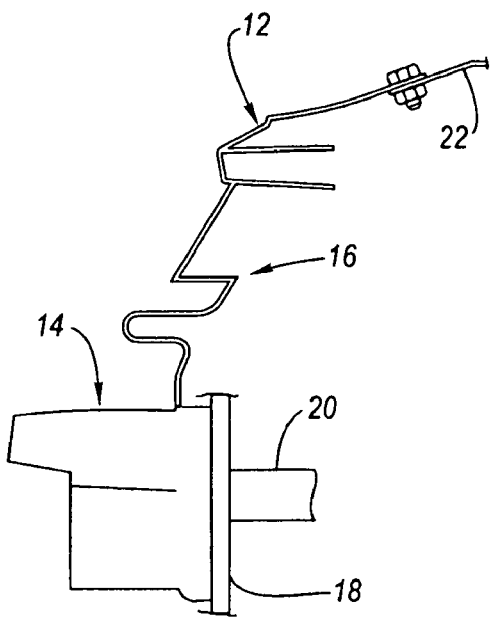
Figure 4C:
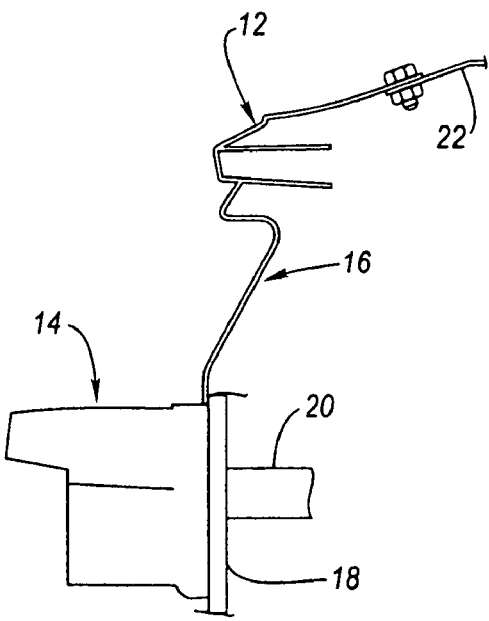

For comparative purposes, FIG. 4A depicts the integrated upper fascia and bumper energy absorber 10 shown schematically installed at the front end of a motor vehicle, wherein the load isolator 16 is U-shaped; FIG. 4B depicts the integrated upper fascia and bumper energy absorber 10 shown schematically installed at the front end of a motor vehicle, wherein the load isolator 16 is semicircularly shaped; and FIG. 4C depicts the integrated upper fascia and bumper energy absorber 10 shown schematically installed at the front end of a motor vehicle, wherein the load isolator 16 is irregularly shaped.

Now referring to FIGS. 1, 5 and 6, it will be understood that the number, placement, width, thickness and shape of the load isolator arms is predetermined to accommodate a specific vehicular application, as for example the front or rear of a vehicle, or whether the vehicle is a truck or passenger car.

Form the foregoing, it is clear that the integrated bumper energy absorber and upper fascia support member 10 provides improved appearance due to a tighter fit of vehicular components and attached parts, yet eliminates the need of separate components and reduces piece cost through tooling savings, manufacturing, shipping, processing and material management. Consequently, the assembly plants manufacturing motor vehicles equipped with the present invention achieve higher quality and improved productivity.

Some notable aspects of the present invention are: the load isolator can be uniform or can be differently structured by location; the load isolator material can be the same as the bumper energy absorber material or can be a different material; the load isolator can run continually between the upper fascia support member or can be arranged discretely in the form of load isolator arms; the load isolator arms may have the same shape thickness and width, or may be different; any load (i.e., of thermal or impact origin) is isolated by the load isolator between the upper fascia support member and the bumper energy absorber, yet the load isolator provides connection and relative positional orientation between the upper fascia support member and the bumper energy absorber during processing, assembling, shipping, and installing in a motor vehicle; and the upper fascia support member may carry the bumper pads required to achieve a desired hood over-slam.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. An automotive component comprising:
   an upper fascia support member,
   a bumper energy absorber; and
   a load isolator integrally connecting said upper fascia support member to said bumper energy absorber, wherein said upper fascia support member is disposed above said bumper energy absorber, and wherein said load isolator comprises at least one curved portion between said upper fascia support member and said bumper energy absorber;
   wherein a load above a predetermined threshold applied relatively with respect to said upper fascia support member and said bumper energy absorber so as to cause a relative displacement of said upper fascia support member relative to said bumper energy absorber results in deformation of said load isolator; and
   wherein said deformation comprises at least one of stretching of said load isolator, bending of said load isolator, stretching and breaking of said load isolator, and bending and breaking of said load isolator.

2. The component of claim 1, wherein said load isolator comprises a plurality of mutually spaced apart load isolator arms connecting said upper fascia support member to said bumper energy absorber.

3. The component of claim 1, wherein said load isolator has a predetermined shape which provides said deformation of said load isolator.

4. The component of claim 3, wherein said predetermined shape of said load isolator comprises at least one of an S-shape, a V-shape, a U-shape, and an irregular shape.

5. The component of claim 4, wherein said load isolator comprises a plurality of mutually spaced apart load isolator arms connecting said upper fascia support member to said bumper energy absorber.

6. The component of claim 5, wherein said upper fascia support member, said load isolator and said bumper energy absorber are made of selectively different materials.

7. The component of claim 1, wherein said upper fascia support member comprises a plurality of predetermined attachment locations for preselected parts to be attached to a motor vehicle.

8. The component of claim 7, wherein said preselected parts comprise hood over-slam bumper pads, head lights and bracketing for a radiator.

9. The component of claim 8, wherein said load isolator has a predetermined shape which provides said deformation of said load isolator.

10. The component of claim 9, wherein said predetermined shape of said load isolator comprises at least one of an S-shape, a V-shape, a U-shape, and an irregular shape.

11. The component of claim 10, wherein said load isolator comprises a plurality of mutually spaced apart load isolator arms connecting said upper fascia support member to said bumper energy absorber.

12. The component of claim 11, wherein said upper fascia support member, said load isolator and said bumper energy absorber are made of selectively different materials.

13. An automotive component comprising:
   an upper fascia support member, wherein said upper fascia support member comprises a plurality of predetermined attachment locations for preselected parts to be attached to a motor vehicle;
   a bumper energy absorber; and
   a load isolator integrally connecting said upper fascia support member to said bumper energy absorber, said load isolator comprising a plurality of mutually spaced apart load isolator arms connecting said upper fascia support member to said bumper energy absorber, wherein said upper fascia support member is disposed above said bumper energy absorber, and wherein said load isolator arms respectively comprise at least one curved portion between said upper fascia support member and said bumper energy absorber;
   wherein a load above a predetermined threshold applied relatively with respect to said upper fascia support member and said bumper energy absorber so as to cause a relative displacement of said upper fascia support member relative to said bumper energy absorber results in deformation of said load isolator; and wherein said deformation comprises at least one of stretching of said load isolator, bending of said load isolator, stretching and breaking of said load isolator, and bending and breaking of said load isolator.

14. The component of claim 13, wherein said load isolator has a predetermined shape which provides said deformation of said load isolator.

15. The component of claim 14, wherein said predetermined shape of said load isolator comprises at least one of an S-shape, a V-shape, a U-shape, and an irregular shape.

16. The component of claim 15, wherein said upper fascia support member, said load isolator and said bumper energy absorber are made of selectively different materials.

17. A motor vehicle, comprising:
a vehicle sheet metal structure;
a vehicle structural member; and
an automotive component comprising:
an upper fascia support member connected to said vehicle sheet metal structure;
a bumper energy absorber connected to said vehicle structural member; and
a load isolator integrally connecting said upper fascia support member to said bumper energy absorber, wherein said upper fascia support member is disposed above said bumper energy absorber, and wherein said load isolator comprises at least one curved portion between said upper fascia support member and said bumper energy absorber;

wherein a load above a predetermined threshold applied relatively with respect to said upper fascia support member and said bumper energy absorber so as to cause a relative displacement of said upper fascia support member relative to said bumper energy absorber results in deformation of said load isolator.

* * * * *